(12) United States Patent
Kim et al.

(10) Patent No.: US 9,586,501 B2
(45) Date of Patent: Mar. 7, 2017

(54) LOCKING DEVICE FOR VEHICLE SEAT RAIL

(71) Applicant: HYUNDAI DYMOS INCORPORATED, Seosan-si, Chungcheongnam-do (KR)

(72) Inventors: Hyun Soo Kim, Seoul (KR); Ho Sub Lim, Seoul (KR)

(73) Assignee: HYUNDAI DYMOS INCORPORATED (KR)

( * ) Notice: Subject to any disclaimer, the term of this patent is extended or adjusted under 35 U.S.C. 154(b) by 0 days.

(21) Appl. No.: 14/724,311

(22) Filed: May 28, 2015

(65) Prior Publication Data

US 2015/0258917 A1    Sep. 17, 2015

Related U.S. Application Data

(63) Continuation of application No. PCT/KR2013/010849, filed on Nov. 27, 2013.

(30) Foreign Application Priority Data

Nov. 28, 2012    (KR) .......................... 10-2012-0136428

(51) Int. Cl.
  *F16M 13/00*    (2006.01)
  *B60N 2/08*     (2006.01)
  *B60N 2/07*     (2006.01)

(52) U.S. Cl.
  CPC ......... *B60N 2/0868* (2013.01); *B60N 2/0705* (2013.01); *B60N 2/0715* (2013.01);
  (Continued)

(58) Field of Classification Search
  CPC ............................ B60N 2/0806; B60N 2/0875
  See application file for complete search history.

(56) References Cited

U.S. PATENT DOCUMENTS

| | | | |
|---|---|---|---|
| 6,892,995 B2* | 5/2005 | Tame .................. | B60N 2/0705 248/429 |
| 7,581,706 B2* | 9/2009 | Kennedy ............. | B60N 2/0806 248/424 |

(Continued)

FOREIGN PATENT DOCUMENTS

| | | |
|---|---|---|
| CN | 102717729 A | 10/2012 |
| JP | 2010-100169 A | 5/2010 |
| KR | 10-2012-0119240 A | 10/2012 |

OTHER PUBLICATIONS

International Search Report issued Feb. 12, 2014 in International Application No. PCT/KR2013/010849.

*Primary Examiner* — Amy Sterling
(74) *Attorney, Agent, or Firm* — Brinks Gilson & Lione

(57) ABSTRACT

The present disclosure provides a locking device for the precise adjustment of the movement position of a vehicle seat rail relative to a fixed rail while not compromising the strength of the seat rail. The locking device includes the seat rail having locking holes, and four locking pins to be inserted in the locking holes. In particular, the locking holes and pins are arranged with predetermined gaps along a longitudinal direction of the seat rail, and a distance between second and third locking pins is different from a distance between first and second locking pins which is the same as a distance between third and fourth locking pins.

6 Claims, 11 Drawing Sheets

(52) U.S. Cl.
CPC ......... *B60N 2/0806* (2013.01); *B60N 2/0818* (2013.01); *B60N 2/0825* (2013.01)

(56) References Cited

U.S. PATENT DOCUMENTS

| | | | | |
|---|---|---|---|---|
| 7,661,646 B2 * | 2/2010 | Weber | .................. | B60N 2/0705 248/429 |
| 8,550,420 B2 * | 10/2013 | Wojatzki | .............. | B60N 2/0705 248/429 |
| 8,870,147 B2 * | 10/2014 | Simms | ................. | B60N 2/0818 248/419 |
| 2003/0164434 A1 | 9/2003 | Frohnhaus et al. | | |

* cited by examiner

0 STEP(ENGAGED)

1 STEP

2 STEP(ENGAGED)

3 STEP(ENGAGED)

4 STEP(ENGAGED)

5 STEP(ENGAGED)

0 STEP(ENGAGED)

1 STEP

2 STEP(ENGAGED)

3 STEP(ENGAGED)

4 STEP

5 STEP(ENGAGED)

6 STEP(ENGAGED)

0 STEP(ENGAGED)

1 STEP

2 STEP

3 STEP

4 STEP

5 STEP(ENGAGED)

6 STEP

7 STEP

8 STEP(ENGAGED)

9 STEP

10 STEP(ENGAGED)

LOCKING DEVICE FOR VEHICLE SEAT RAIL

CROSS-REFERENCE TO RELATED APPLICATIONS

This application is a continuation of International Application No. PCT/KR2013/010849, filed on Nov. 27, 2013, which claims the benefit of Korean Application 10-2012-0136428, filed on Nov. 28, 2012. The disclosures of the above applications are incorporated herein by reference.

FIELD

The present disclosure relates to a locking device for a vehicle seat rail and, more particularly, to a structure of a locking pattern of a moving rail with respect to a fixed rail.

BACKGROUND

The statements in this section merely provide background information related to the present disclosure and may not constitute prior art.

The positions of seats in a vehicle can be adjusted forward/backward on a car body by a fixed rail fixed to the floor of the car body and a moving rail that can slide forward/backward on the car body with respect to the fixed rail, and the adjusted positions can be firmly fixed by a locking device and can be easily changed for adjusting the seats.

Such a device for locking a seat rail generally has the configuration shown in FIG. 1, in which a plurality of holes is formed at a fixed rail 500 and a moving rail 502 and a plurality of locking pins 504 is elastically supported by a plurality of springs 506, so the locking pins 504 are inserted and locked in the holes of the fixed rail 500 and the moving rail 502.

When the locking pins are fixed to the fixed rail, the holes can be formed on the fixed rail in a number equal to the number of the locking pins, but a plurality of holes should also be formed at the moving rail so that the locking pins can be inserted even in a relative movement state, and the movement pitch of the moving rail with respect to the fixed rail is determined by the gaps and the sizes of the holes (hereafter, referred to as locking holes) formed at the moving rail.

That is, when the locking holes are more densely formed, the moving rail can be slightly moved and locked with respect to the fixed rail, so a user can more precisely adjust the position of a seat.

Accordingly, the smaller the pitch of the locking holes, the smaller the pitch in the locking state, so the locking positions can be more precisely adjusted. However, when the pitch of the locking holes is small, the strength of the seat rail having the locking hole decreases.

The locking holes may be formed at the moving rail or the fixed rail in accordance with whether the locking pins are inserted into the moving rail or the fixed rail and the moving rail and the fixed rail can be referred to as seat rails, so when it is described that the locking holes are formed at a seat rail in the following description, it means that the locking holes can be formed selectively at one of the moving rail and the fixed rail.

The description provided above as a related art of the present disclosure is only for helping understanding the background of the present disclosure and should not be construed as being included in the related art known by those skilled in the art.

SUMMARY

The present disclosure provides a locking device for a vehicle seat that allows a user to adjust a seat position into a desired state by providing a relatively small pitch in a locking state so that the position of a moving rail relative to a fixed rail can be more slightly adjusted without decreasing the strength of the seat rails.

According to another aspect of the present disclosure, there is provided a locking device for a vehicle seat rail that includes a seat rail longitudinally sliding and having a plurality of locking holes to be fixed in a locking state by locking pins inserted perpendicular to the sliding direction, in which the locking holes of the seat rail have a predetermined size and are arranged in a line with predetermined gaps in a sliding direction of the seat rail, four locking pins are arranged in a line in the sliding direction of the seat rail, and in the locking pins, a distance between a first pin and a second pin according to an arrangement order is the same as a distance between a third pin and a fourth pin, but a distance between the second pin and the third pin is different from the distance between the first pin and the second pin.

According to the present disclosure, it is possible to finely adjust the position of a moving rail relative to a fixed rail so that the pitch in a locking state is small, without decreasing the strength of a seat rail, so a user can adjust a seat position to a desired state.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
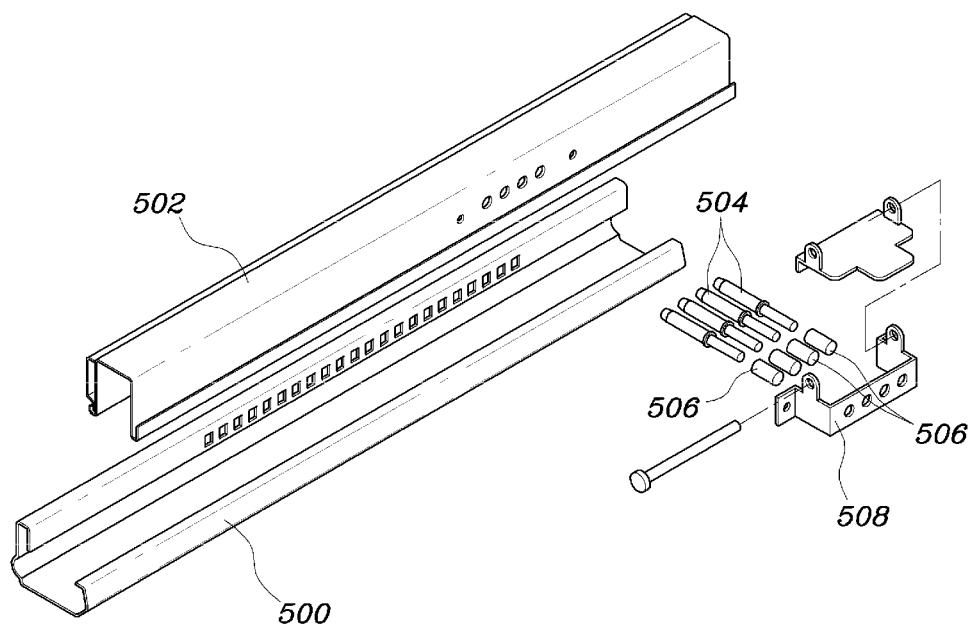
FIG. 1 is an exemplary view showing a locking device for a vehicle seat according to the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
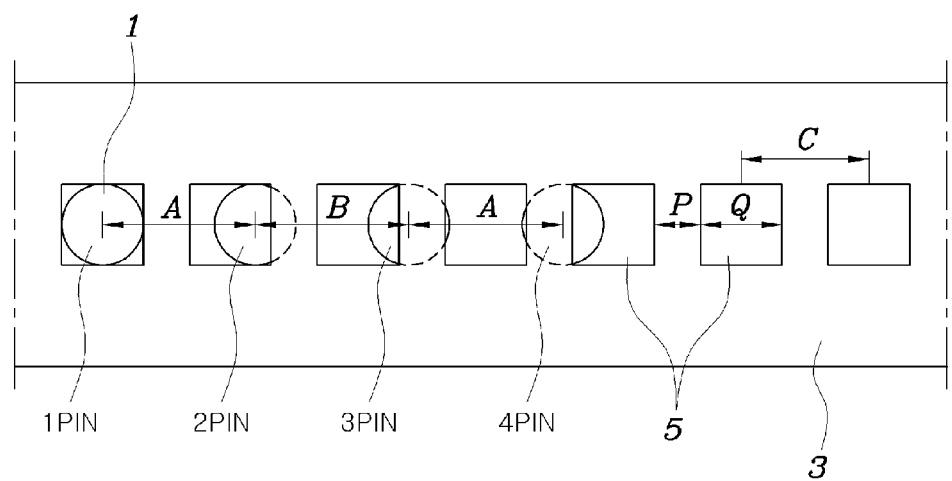
FIG. 2 is a view showing in detail the main configuration of a locking device for a vehicle seat rail according to the present disclosure.
Figure 3:
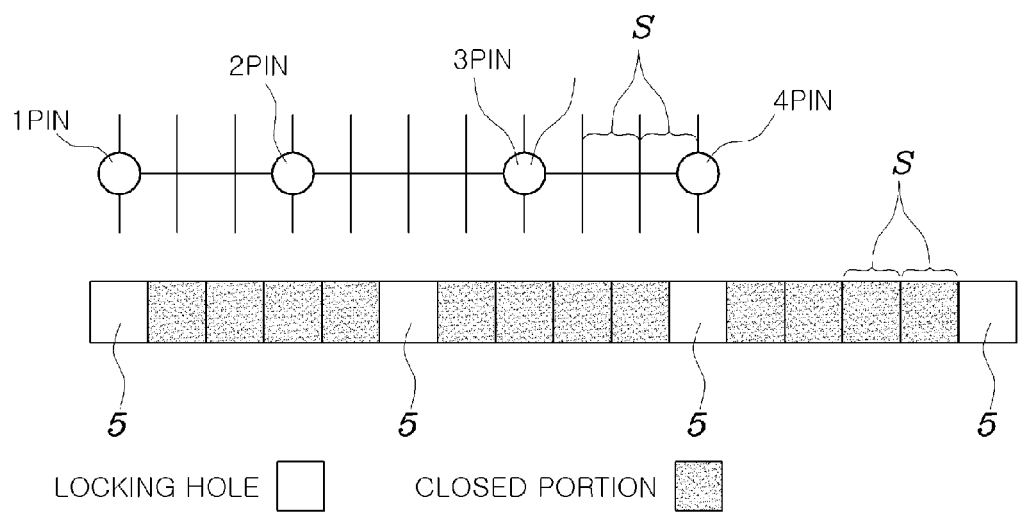
FIG. 3 is a view showing an example of arrangement of locking holes and locking pins according to the present disclosure.
Figure 4A:
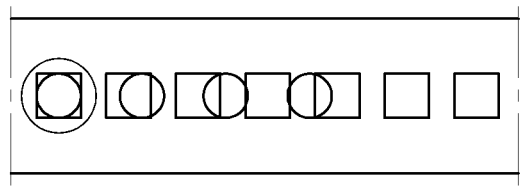
FIGS. 4A-4F are a view illustrating a first form of the locking device for a vehicle seat rail according to the present disclosure.
Figure 4B:
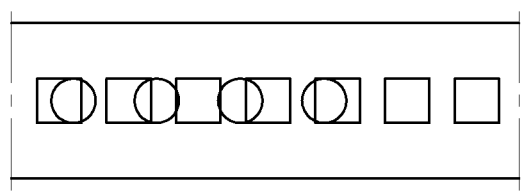
Figure 4C:
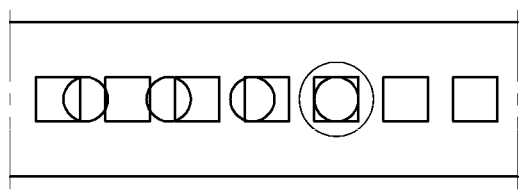
Figure 4D:
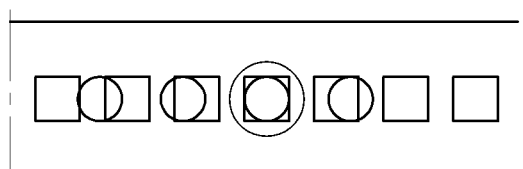
Figure 4E:
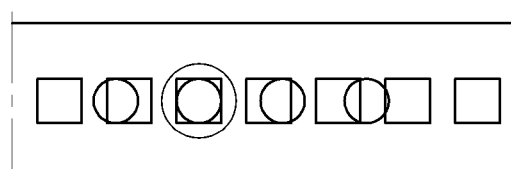
Figure 4F:
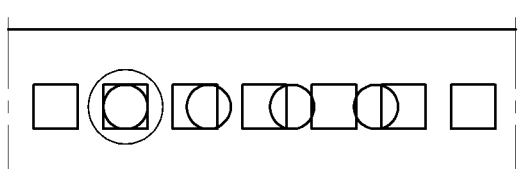
Figure 5A:
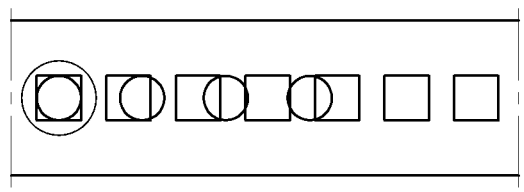
FIGS. 5A-5G are a view illustrating a second form of the locking device for a vehicle seat rail according to the present disclosure.
Figure 5B:
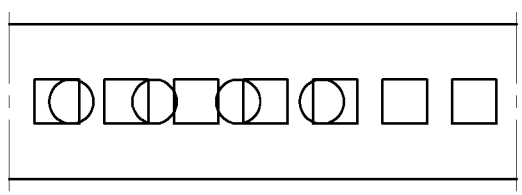
Figure 5C:
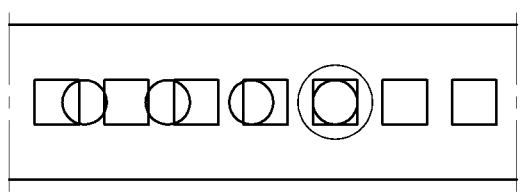
Figure 5D:
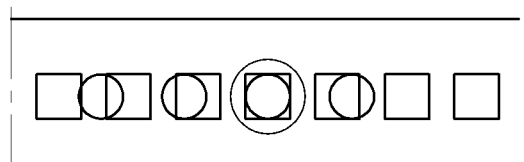
Figure 5E:
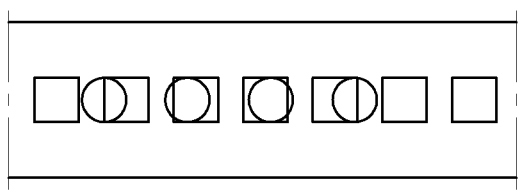
Figure 5F:
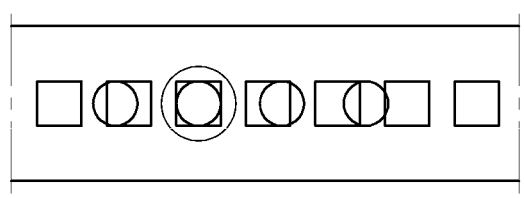
Figure 5G:
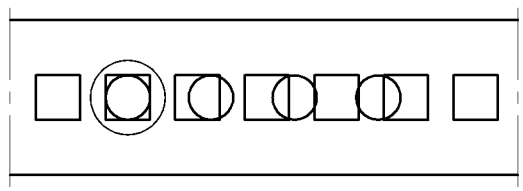
Figure 6A:
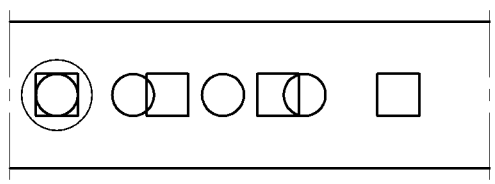
FIGS. 6A-6K are a view illustrating a third form of the locking device for a vehicle seat rail according to the present disclosure.
Figure 6B:
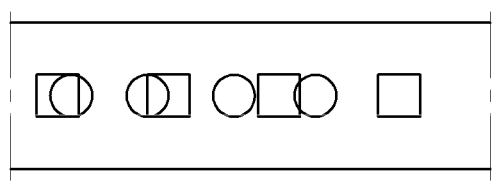
Figure 6C:
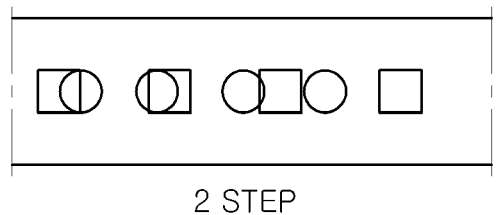
Figure 6D:
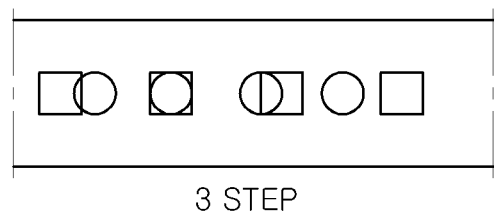
Figure 6E:
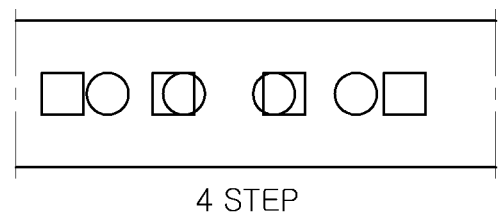
Figure 6F:
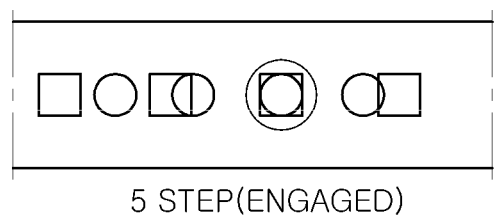
Figure 6G:
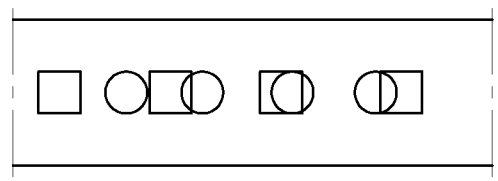
Figure 6H:
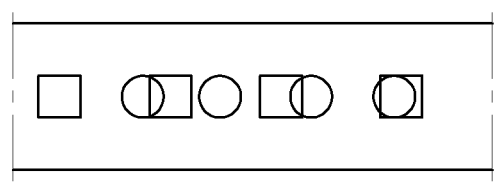
Figure 6I:
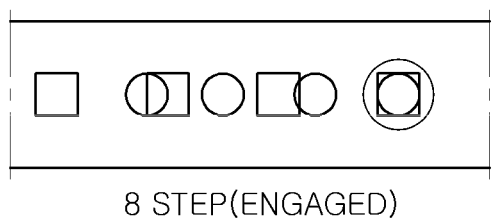
Figure 6J:
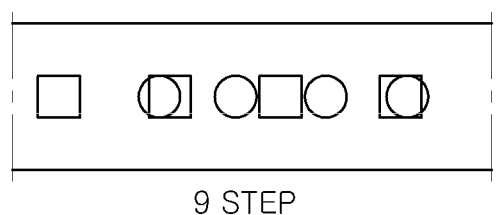
Figure 6K:
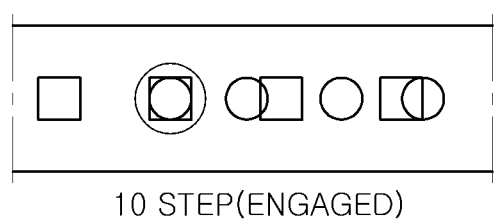

Referring to FIGS. 2 and 3, forms of a locking device for a vehicle seat rail according to the present disclosure include a seat rail 3 that longitudinally slides and has a plurality of locking holes 5 to be fixed in a locking state by locking pins 1 inserted perpendicular to the sliding direction. The locking holes 5 of the seat rail 3 have a predetermined size and are arranged in a line with predetermined gaps in the sliding direction of the seat rail 3. Four locking pins 1 are arranged in a line in the sliding direction of the seat rail 3. In the locking pins 1, the distance between a first pin and a second pin according to the arrangement order is the same as the distance between a third pin and a fourth pin, but the distance between the second pin and the third pin is different from the distance between the first pin and the second pin.

That is, at least one of the four locking pins 1 arranged in a line is inserted in a locking hole 5 of the seat rail 3 to make a locking state, and the locking holes 5 are arranged with regular intervals, but the locking pins 1 are arranged such that the distance B between the second pin and the third pin is different from the distance A between the first pin and the second pin and between the third pin and the fourth pin. Accordingly, it is possible to achieve a locking state with small pitches, unlike the related art in which the locking pins 1 are arranged with regular intervals.

Accordingly, as compared with the related art, the strength of the seat rail 5 can be maintained, even though the locking holes 5 are formed, and relatively small pitches for a locking state are achieved, so a user can adjust a seat to a more desired state.

The length of the locking holes 5 of the seat rail 3 in the sliding direction of the seat rail 3 is the same as the diameter of the locking pins 1. In the present disclosure, the term 'same' does not mean 'completely the same', but means that the length is determined such that it does not interfere with inserting the locking pins 1 into the locking holes 5 and the locking pins 1 can be held in the locking state without shaking or moving.

The distances between the locking pins 1 are integer multiples of a predetermined reference distance S, and the distance A between the first pin and the second pin and the distance A between the third pin and the fourth pin are smaller than the distance B between the second pin and the third pin.

The reference distance S is a unit length that can divide the distances between the locking pins by an integer multiple, as shown in FIG. 3, and it means the minimum unit distance that the locking pins 1 move, which is described below.

The locking holes 5 of the seat rail 3 are arranged with regular intervals in a line and spaced from each other by an integer multiple of the reference distance S.

Referring to FIG. 3, the locking holes 5 are spaced from each other by four reference distances, the distances from the first pin to the second pin and from the third pin to the fourth pin are three times the reference distance, and the distance from the second pin to the third pin is four times the reference distance.

When this relationship is applied to FIG. 2, the relationships of $A=L*S$, $B=M*S$, $C=N*S$, $Q=D$, and $P=C-Q$ are obtained, where A is the distance between the first pin and the second pin and between the third pin and the fourth pin, B is the distance between the second pin and the third pin, C is the distance between the centers of the locking holes 5, D is the diameter of the locking pins 1, L is a multiple of the reference distance between the first pin and the second pin, M is a multiple of the reference distance between the second pin and the third pin, N is a multiple of the reference distance between the locking holes 5, P is the distance between the locking holes 5, Q is the width of the locking holes 5, and the unit movement amount S of the locking pins 1 is equal to the reference distance.

Forms of the present disclosure are described hereafter with reference to FIGS. 4A-4F, 5A-5G and 6A-6K. As can be seen from the following forms, in the locking pins 1, the distance between the first pin and the second pin and the distance between the third pin and the fourth pin are smaller by the reference distance S than the distance between the second pin and the third pin.

That is, referring to the first form shown in FIGS. 4A-4F, L, which is a multiple of the reference distance between the first pin and the second pin, is 6, M, which is a multiple of the reference distance between the second pin and the third pin, is 7, and N, which is a multiple of the reference distance between the locking holes, is 5, so L is smaller than M by 1.

Referring to the second form shown in FIGS. 5A-5G, L, which is a multiple of the reference distance between the first pin and the second pin, is 7, M, which is a multiple of the reference distance between the second pin and the third pin, is 8, and N, which is a multiple of the reference distance between the locking holes, is 6, so L is smaller than M by 1.

Referring to the third form shown in FIGS. 6A-6K, L, which is a multiple of the reference distance between the first pin and the second pin, is 7, M, which is a multiple of the reference distance between the second pin and the third pin, is 8, and N, which is a multiple of the reference distance between the locking holes, is 10, so L is smaller than M by 1.

For reference, it is assumed in the first to third forms that the distance between the first pin and the second pin is 13 mm.

Referring to FIGS. 4A-4F, when the locking pins 1 move the reference distance to the right into 1 Step from 0 Step with the first pin inserted in a locking hole 5, no locking pins 1 are inserted in the locking holes 5. The reference distance is 2.2 mm and the locking pins 1 move 2.2 mm to the right step by step.

As shown in the figure, the fourth pin is inserted in a locking hole in 2 Step, the second pin is inserted in a locking hole 5 in 4 Step, and the first pin is inserted in a locking hole 5 in 5 Step to achieve the locking state, so the locking state is achieved at minimum every 2.2 mm and maximum every 4.4 mm If the locking pins 1 are arranged with regular intervals, as in the related art, a locking state can be achieved at every 6.5 mm, which is a half the distance of 13 mm between the locking pins 1, even though the locking pins 1 are alternately inserted in the locking holes 5. Accordingly, it is possible to make more locking states.

In the second form shown in FIGS. 5A-5G, the reference distance is 1.9 mm, and when a locking pin 1 moves the reference distance to the right through total six steps, it is inserted into the next locking hole 5.

That is, the first pin is inserted in a locking hole 5 in 0 Step, and when the locking pins 1 move the reference distance to the right into 1 Step, any locking pins 1 are not inserted in the locking holes 5, so a locking state is not achieved. However, when the locking pins move the reference distance into 2 Step, the fourth pin is inserted in a locking hole 5. Further, the third pin is inserted in a locking hole in 3 Step, a locking state is not achieved in 4 Step, and the second and the first pin are inserted in a locking hole 5 in 5 Step and 6 Step, respectively, which makes one cycle.

In this case, a locking state is achieved at minimum every 1.9 mm and maximum every 3.8 mm, so it is possible to more finely adjust the locking state.

In the third form shown in FIGS. 6A-6K, the reference distance is 1.8 mm, and when a locking pin 1 moves the reference distance to the right through a total of ten steps, it is inserted in the next locking hole 5, which makes one cycle. Accordingly, as shown in the figures, a locking state can be achieved in 0 Step, 5 Step, 8 Step, and 10 Step, so the locking state can be achieved at minimum every 3.8 mm and maximum every 5.7 mm.

Further, it is possible to achieve a fourth form in which L is 8, M is 9, N is 11, and the reference distance is 1.6 mm, so a locking state can be achieved at minimum every 3.2 mm and maximum every 4.8 mm, a fifth form in which L is 10, M is 11, N is 14, and the reference distance is 1.3 mm, so a locking state can be achieved at minimum every 3.9 mm and maximum every 5.2 mm, and a sixth form in which L is 11, M is 12, N is 15, and the reference distance is 1.2 mm, so a locking state can be achieved at minimum every 3.6 mm and maximum every 4.8 mm.

Although the present disclosure was described with reference to specific forms shown in the drawings, it is apparent to those skilled in the art that the present disclosure may be changed and modified in various ways without departing from the scope of the present disclosure, which is described in the following claims.

What is claimed is:

1. A locking device for a vehicle seat rail, comprising:
a seat rail configured to longitudinally slide and comprising a plurality of locking holes; and
locking pins configured to insert in at least one of the plurality of locking holes in a perpendicular direction to a sliding direction of the seat rail,
wherein the plurality of the locking holes have a predetermined size and are arranged in a line with predetermined gaps in the sliding direction of the seat rail, and the locking pins comprising at least four locking pins arranged in a line in the sliding direction of the seat rail, and wherein a distance between a first locking pin and a second locking pin according to an arrangement order is substantially same as a distance between a third locking pin and a fourth locking pin, while a distance between the second locking pin and the third locking pin is different from the distance between the first locking pin and the second locking pin, and wherein the locking pins are separated each other so that always only one of the locking pins can be inserted in one of the locking holes at every locking position where the seat rail is locked by inserting of any of the locking pins in any of the locking holes.

2. The locking device according to claim 1, wherein a length of each of the locking holes of the seat rail in the sliding direction of the seat rail is substantially same as a diameter of each of the locking pins.

3. The locking device according to claim 2, wherein the distances between the locking pins are integer multiples of a predetermined reference distance, and
the distance between the first locking pin and the second locking pin and the distance between the third locking pin and the fourth locking pin are smaller than the distance between the second locking pin and the third locking pin.

4. The locking device according to claim 3, wherein the distance between the first locking pin and the second locking pin and the distance between the third locking pin and the fourth locking pin are smaller by the predetermined reference distance than the distance between the second locking pin and the third locking pin.

5. The locking device according to claim 4, wherein the plurality of the locking holes are arranged with regular intervals in a line and spaced from each other by an integer multiple of the predetermined reference distance.

6. The locking device according to claim 3, wherein the distances from the first locking pin to the second locking pin and from the third locking pin to the fourth locking pin are three times the predetermined reference distance, and the distance from the second locking pin to the third locking pin is four times of the predetermined reference distance.

* * * * *